(12) United States Patent
Yin et al.

(10) Patent No.: US 9,174,556 B2
(45) Date of Patent: Nov. 3, 2015

(54) MULTI-FUNCTIONAL TABLE AND CHAIR DEVICE

(71) Applicant: Wan-Yu Li, Taipei (TW)

(72) Inventors: Qing-Kun Yin, Zhuhai (CN); Chin-Chen Chang, Taipei (TW)

(73) Assignee: Wan-Yu Li (TW)

( * ) Notice: Subject to any disclaimer, the term of this patent is extended or adjusted under 35 U.S.C. 154(b) by 2 days.

(21) Appl. No.: 14/272,935

(22) Filed: May 8, 2014

(65) Prior Publication Data
US 2015/0158400 A1    Jun. 11, 2015

(30) Foreign Application Priority Data
Dec. 6, 2013 (CN) .......................... 2013 1 0648154

(51) Int. Cl.
| | |
|---|---|
| A47C 13/00 | (2006.01) |
| B60N 2/34 | (2006.01) |
| B61D 33/00 | (2006.01) |
| B61D 37/00 | (2006.01) |
| B64D 11/06 | (2006.01) |

(52) U.S. Cl.
CPC ................ *B60N 2/34* (2013.01); *B61D 33/005* (2013.01); *B61D 33/0021* (2013.01); *B61D 37/00* (2013.01); *B64D 11/0605* (2014.12); *B64D 11/0638* (2014.12); *B64D 11/0641* (2014.12); *B64D 11/0648* (2014.12)

(58) Field of Classification Search
CPC .................................. B60N 2/34; B61D 37/00
USPC ...... 297/67, 118, 157.1, 158.1, 158.2, 174 R, 297/119; 5/2.1, 3, 12.1; 108/143, 42
See application file for complete search history.

(56) References Cited

U.S. PATENT DOCUMENTS

| | | | | |
|---|---|---|---|---|
| 5,947,416 | A * | 9/1999 | Kraft ........................... | 244/118.5 |
| 6,209,956 | B1 * | 4/2001 | Dryburgh et al. ............. | 297/245 |
| 2014/0237717 | A1 * | 8/2014 | Wong et al. ........................ | 5/2.1 |

* cited by examiner

*Primary Examiner* — Syed A Islam
(74) *Attorney, Agent, or Firm* — Hershkovitz & Associates, PLLC; Abe Hershkovitz

(57) ABSTRACT

A multi-functional table and chair device has a base, two opposite chair sets mounted on the base, and an adjustable table. Each chair set has at least one chair, and each chair has a supporting bracket, a seat, a backrest and a footrest. The adjustable table is mounted on the base between the chair sets and has a bottom bracket, an elevation mechanism and a table board. When the backrest of one chair is pivoted backward and the footrest is unfolded, the chair is changed into a deck chair. When the footrests of two opposite chairs of the chair sets are pivoted upward and unfolded to be horizontal and the adjustable table is raised to hold the footrests, the two opposite chairs and the adjustable table form a bed.

8 Claims, 18 Drawing Sheets

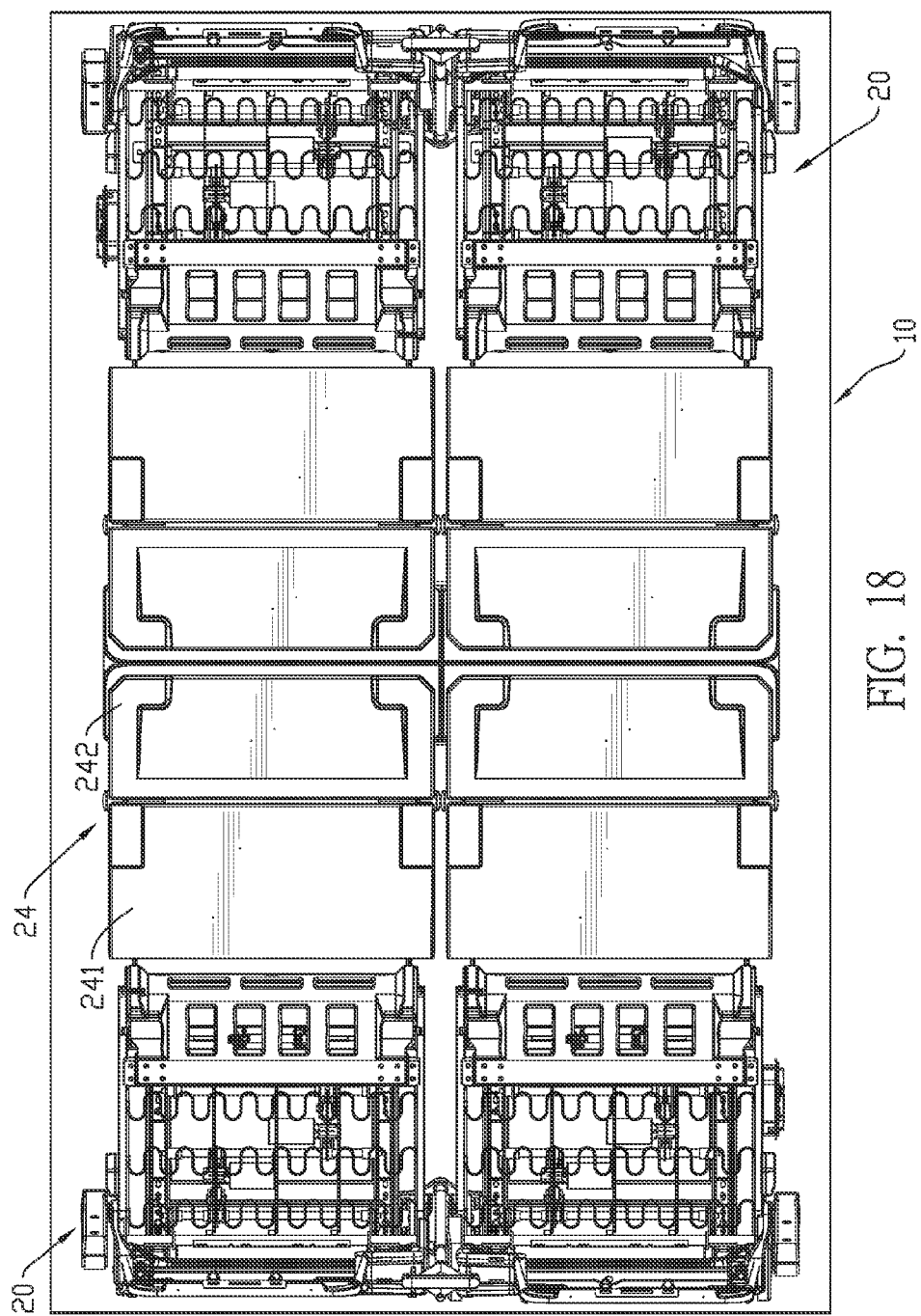

MULTI-FUNCTIONAL TABLE AND CHAIR DEVICE

BACKGROUND OF THE INVENTION

1. Field of the Invention

The present invention relates to a table and chair device, and more particularly to a multi-functional table and chair device that allows different users to carry out different activities such as sitting, lying, resting and dining.

2. Description of Related Art

Passengers in public transports such as trains, high speed rail trains, metro trains or airplanes often sit for a long time and even needs to dine and sleep on seats. Therefore comfortableness and additional functions that a seat can provide to a passenger are important.

Each of conventional chairs of public transports usually has a footrest and armrests to allow a passenger to rest his/her feet or arms thereon. The chairs are arranged tandem and each chair has a folding table mounted pivotally on a rear thereof so that a passenger sitting on a rear chair is able to fold downward the folding table on the front chair for 90 degrees to dine or read on the folding table. However, the footrest is inclined when extended out instead of being horizontal so that the passenger is not allowed to lie down flatly and comfortably sleep. Furthermore, the table cannot be adjusted and held in different levels, which does not suit for different passengers.

To overcome the shortcomings, the present invention provides a multi-functional table and chair device to mitigate or obviate the aforementioned problems.

SUMMARY OF THE INVENTION

The main objective of the invention is to provide a multi-functional table and chair device that allows different users to carry out different activities such as sitting, lying, resting and dining.

A multi-functional table and chair device in accordance with the present invention has a base, two opposite chair sets mounted on the base, and an adjustable table. Each chair set has at least one chair, and each chair has a supporting bracket, a seat, a backrest and a footrest. The adjustable table is mounted on the base between the chair sets and has a bottom bracket, an elevation mechanism and a table board. When the backrest of the chair is pivoted backward and the footrest is unfolded, the chair is changed into a deck chair. When the footrests of two opposite chairs of the chair sets are pivoted upward and unfolded to be horizontal and the adjustable table is raised to hold the footrests, the two opposite chairs and the adjustable table form a bed.

Other objectives, advantages and novel features of the invention will become more apparent from the following detailed description when taken in conjunction with the accompanying drawings.

BRIEF DESCRIPTION OF THE DRAWINGS

FIG. 18 is a top view of the multi-functional table and chair device in FIG. 17.

DETAILED DESCRIPTION OF THE PREFERRED EMBODIMENT

Figure 1:
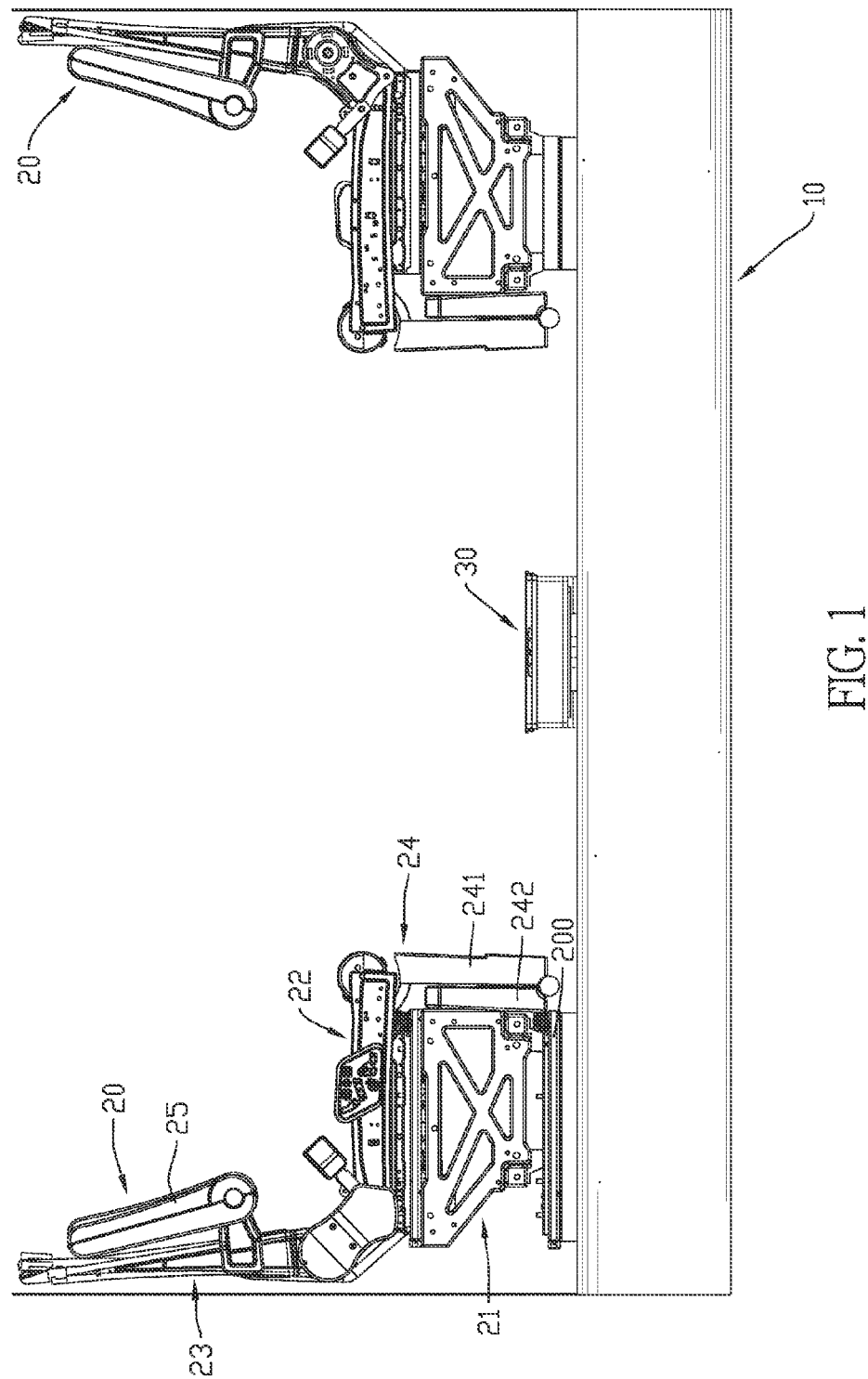
FIG. 1 is a side view of a multi-functional table and chair device in accordance with the present invention.
Figure 2:
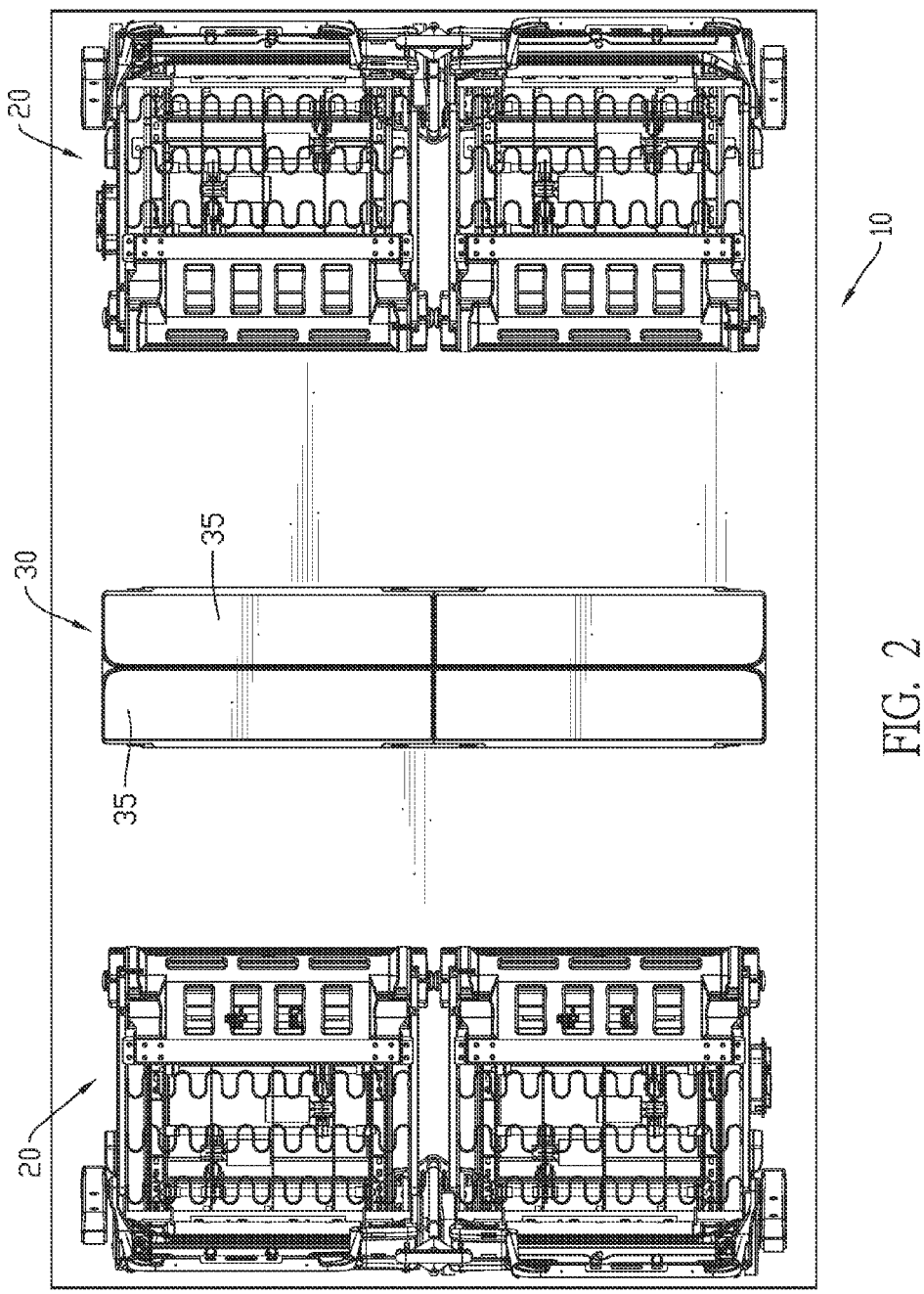
FIG. 2 is a top view of the multi-functional table and chair device in FIG. 1.

With reference to FIGS. 1 and 2, a multi-functional table and chair device in accordance with the present invention has a base 10, two opposite chair sets, and an adjustable table 30.

Figure 3:
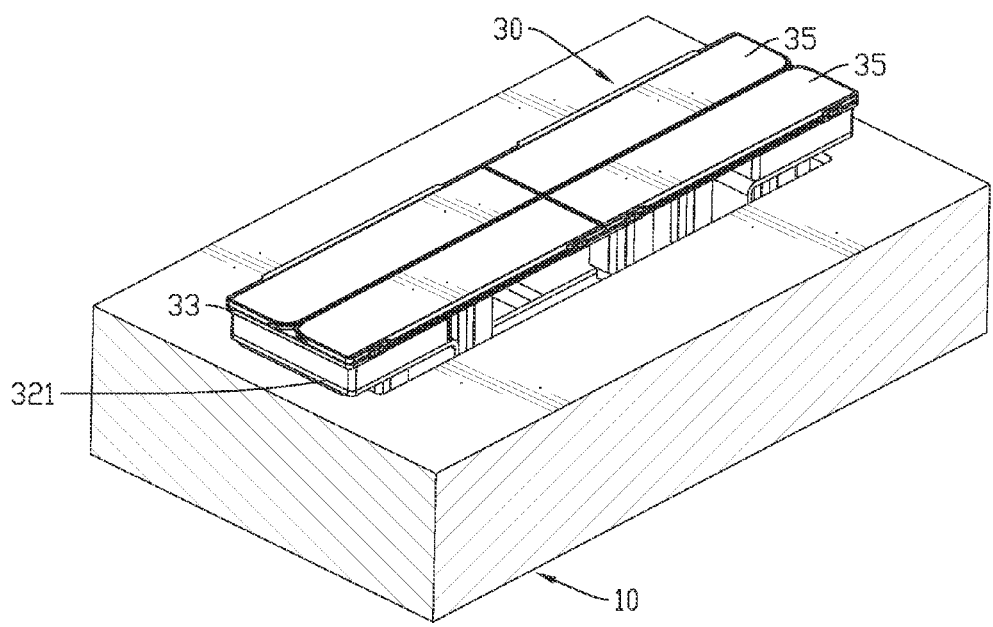
FIG. 3 is an operational perspective view of an adjustable table of the multi-functional table and chair device in FIG. 1, extended and raised to a first level.
Figure 4:
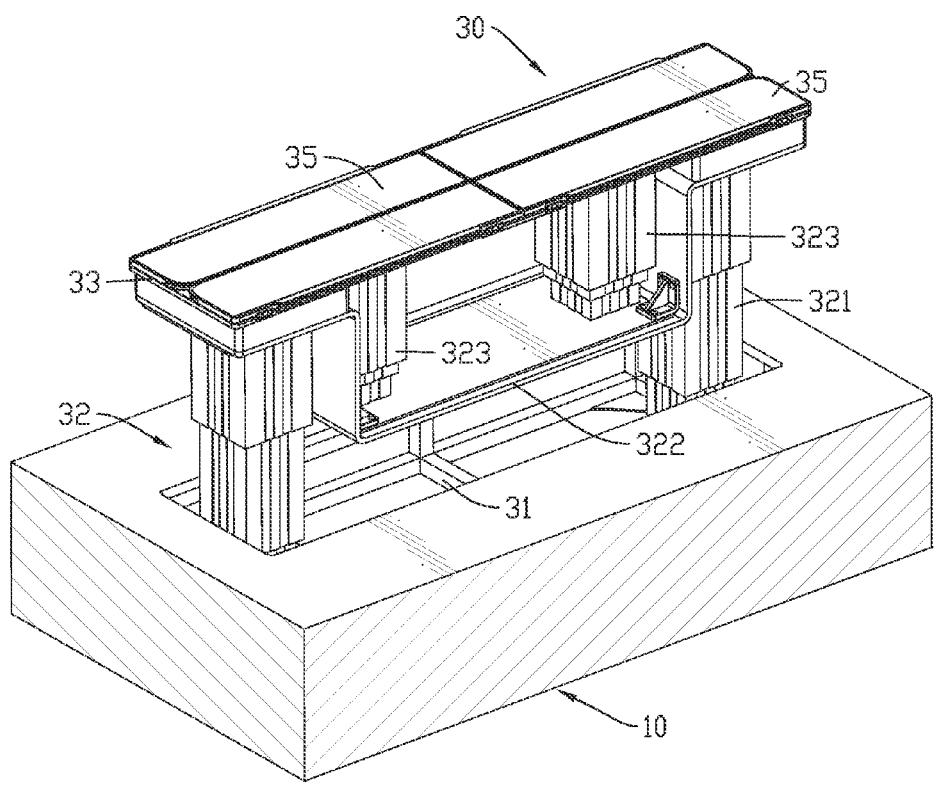
FIG. 4 is an operational perspective view of the adjustable table of the multi-functional table and chair device in FIG. 3, further extended and raised to a second level.

With further reference to FIGS. 3 and 4, the base 10 may be a board mounted on a floor in a public transport such as a train, a high speed rail train, a metro train or an airplane, or may be the floor of the public transport.

The chair sets are mounted on the base 10 and each chair set has at least one chair 20. In a preferred embodiment of the present invention, each chair set has two chairs 20 arranged abreast. Each chair 20 has a rail 200, a supporting bracket 21, a seat 22, a backrest 23, a footrest 24 and two armrests 25.

The rail 200 is mounted securely on the base 10.

The supporting bracket 21 is mounted on the base 10, may be mounted slidably on the rail 200 and is capable of sliding back and forth relative to the rail 200.

The seat 22 is mounted slidably on a top of the supporting bracket 21 and is capable of sliding back and forth relative to the supporting bracket 21.

The backrest 23 is mounted pivotally on a rear end of the seat 22.

The footrest 24 is mounted pivotally on a front end of the seat 22 and has a rest plate 241 and an extension plate 242.

The rest plate 241 is mounted pivotally on the front end of the seat 22. The extension plate 242 is mounted pivotally on a front end of the rest plate 241.

The armrests 25 are mounted respectively on opposite sides of the backrest 23.

Figure 5:
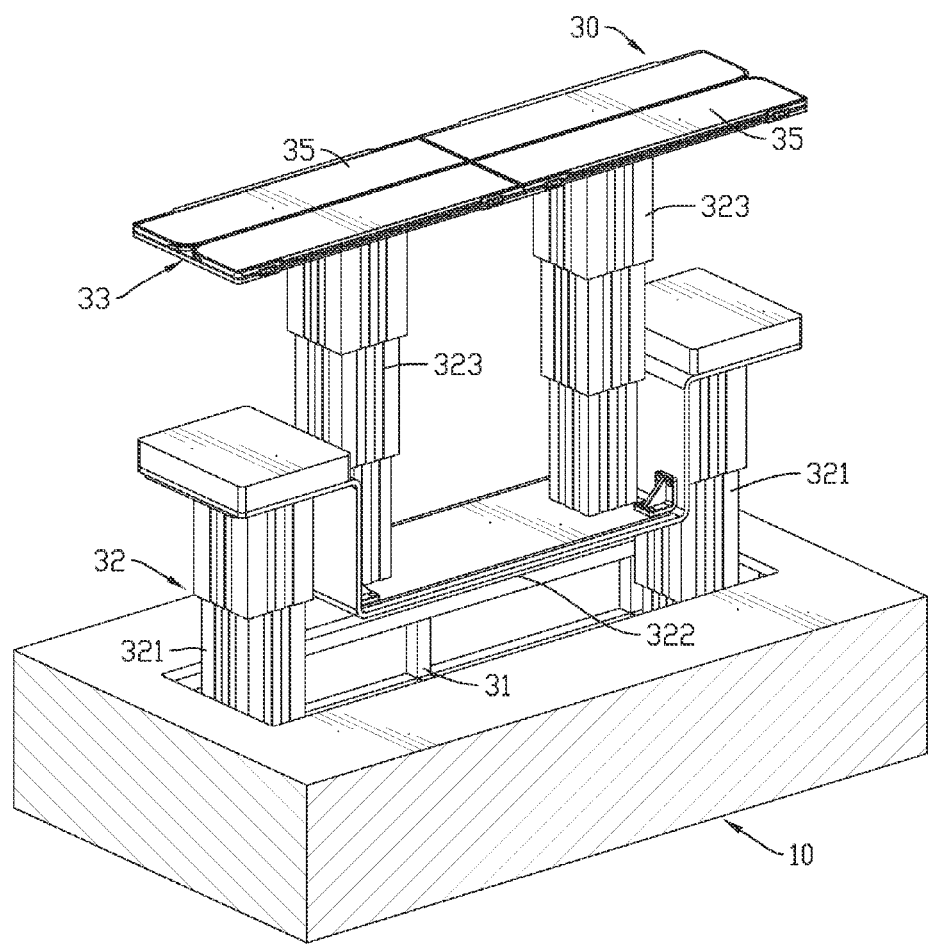
FIG. 5 is an operational perspective view of the adjustable table of the multi-functional table and chair device in FIG. 4, completely extended and raised to a third level.
Figure 6:
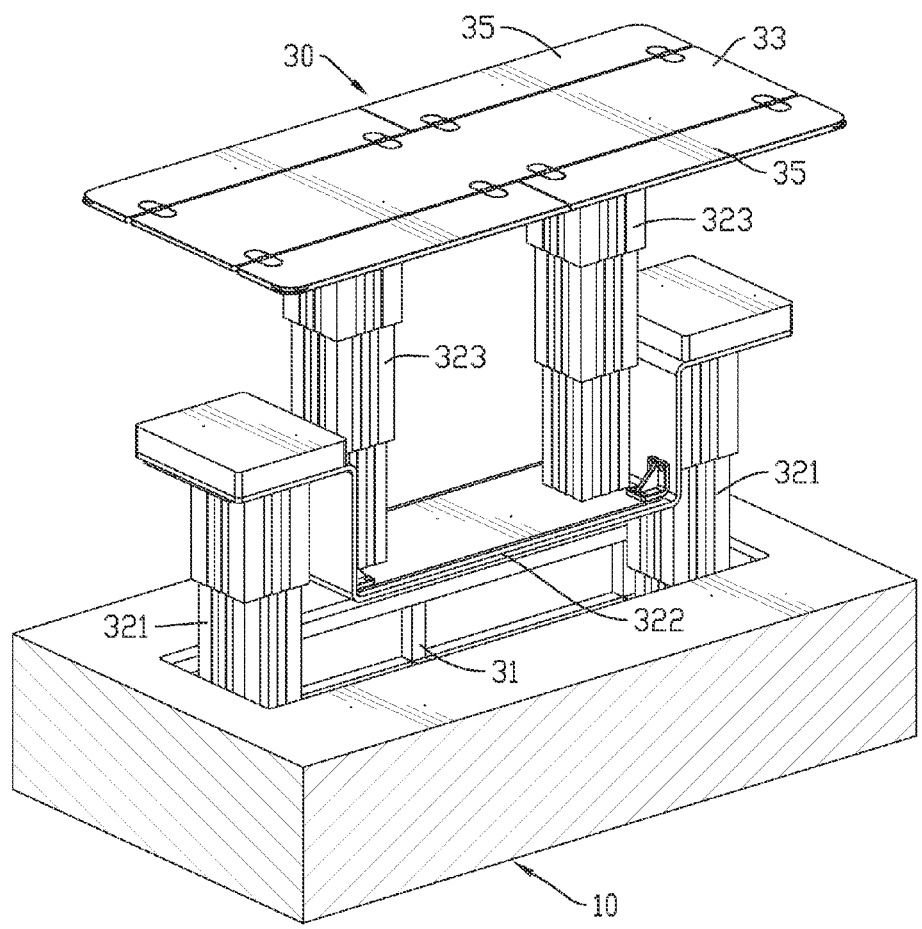
FIG. 6 is an operational perspective view of the adjustable table of the multi-functional table and chair device in FIG. 5, with two opposite extension boards unfolded.

With further reference to FIGS. 5 and 6, the adjustable table 30 is mounted on the base 10 between the chair sets and has a bottom bracket 31, an elevation mechanism 32 and a table board 33.

The bottom bracket 31 is mounted on the base 10.

The elevation mechanism 32 is mounted on the bottom bracket 31 and is capable of extending or retracting vertically.

The table board 33 is mounted on a top of the elevation mechanism 32 and is selectively raised or lowered to be higher than the seat 22, aligned with the seat 22, or lower than the seat 22. The table board 33 has two extension boards 35. The extension boards 35 are pivotally mounted respectively on two opposite sides of the table board 33 and are selectively folded and stacked on the table board 33 or unfolded outward to be horizontal.

With reference to FIGS. 3 to 6, in a preferred embodiment of the present invention, the elevation mechanism 32 of the adjustable table 30 has a first electronic telescopic assembly and a second electronic telescopic assembly. The first electronic telescopic assembly has two first electronic telescopic bars 321 and a mounting bracket 322 mounted between the first electronic telescopic bars 321. The second electronic telescopic assembly has two second electronic telescopic bars 323 mounted on the mounting bracket 322 and mounted under the table board 33.

Figure 7:
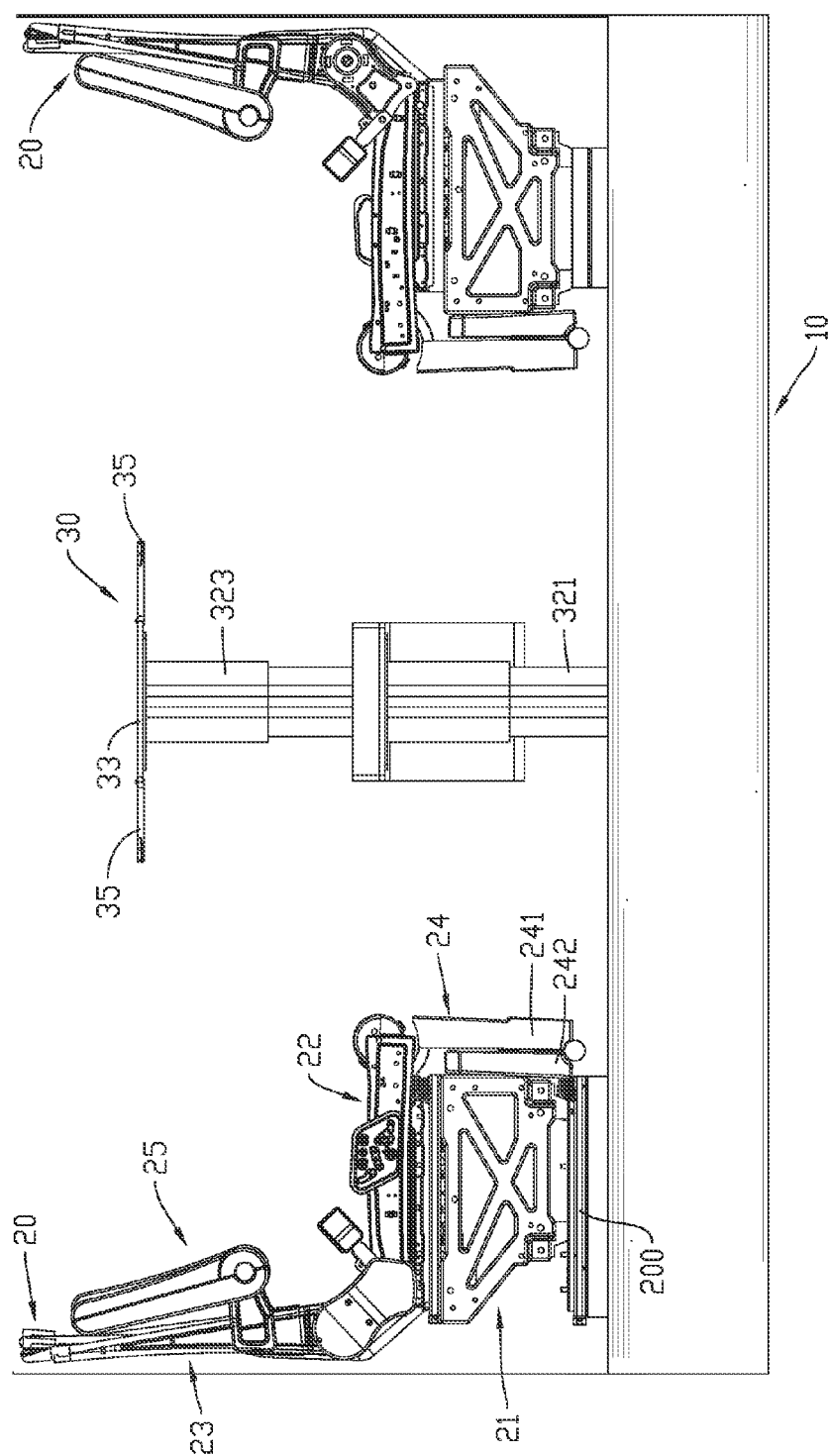
FIG. 7 is an operational side view of the multi-functional table and chair device in FIG. 1 with the adjustable table raised and unfolded completely.
Figure 8:
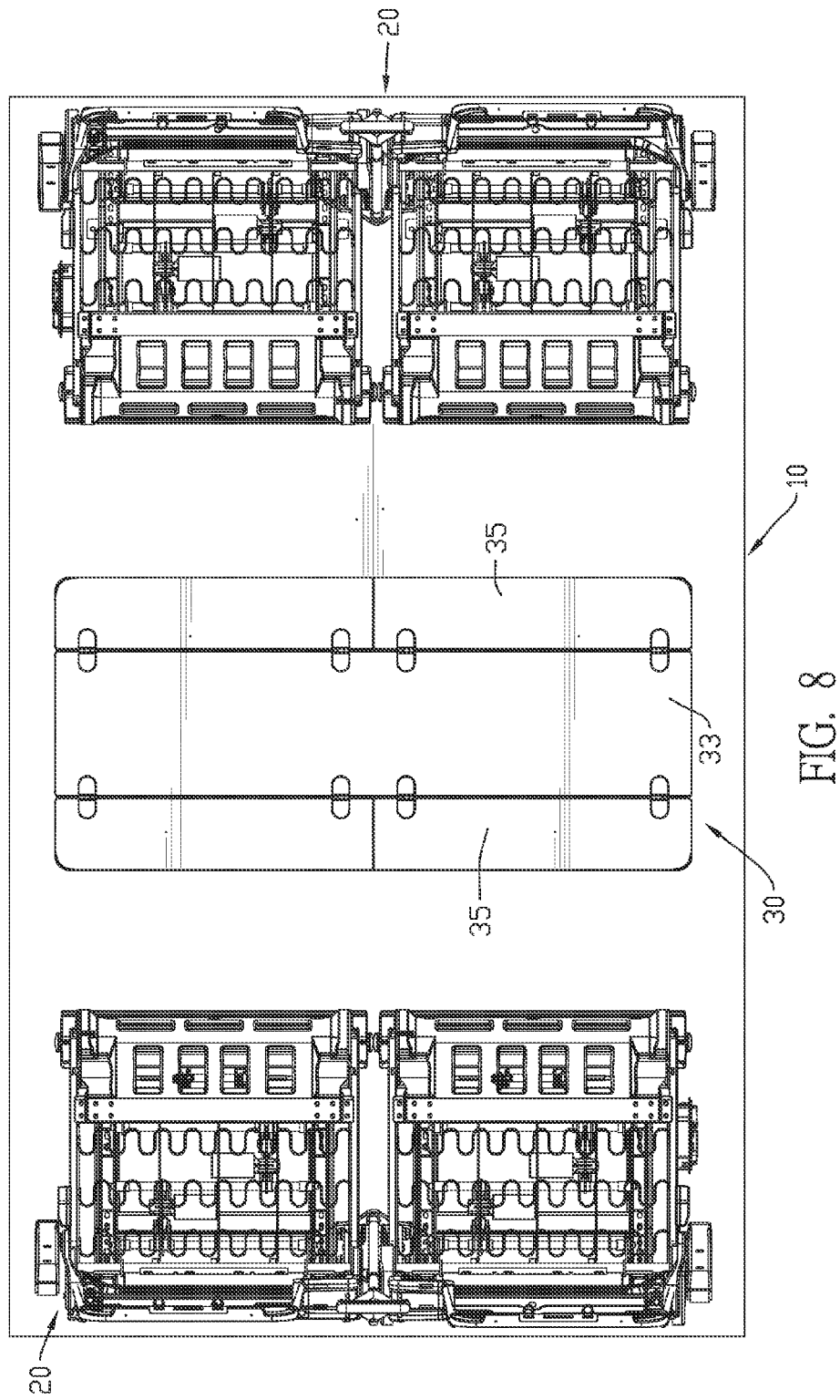
FIG. 8 is an operational top view of the multi-functional table and chair device in FIG. 7.

With further reference to FIGS. 7 and 8, the table board 33 of the adjustable table 30 may be raised to be higher than the seat 22 to serve as a dining table or a desk for reading.

Figure 9:
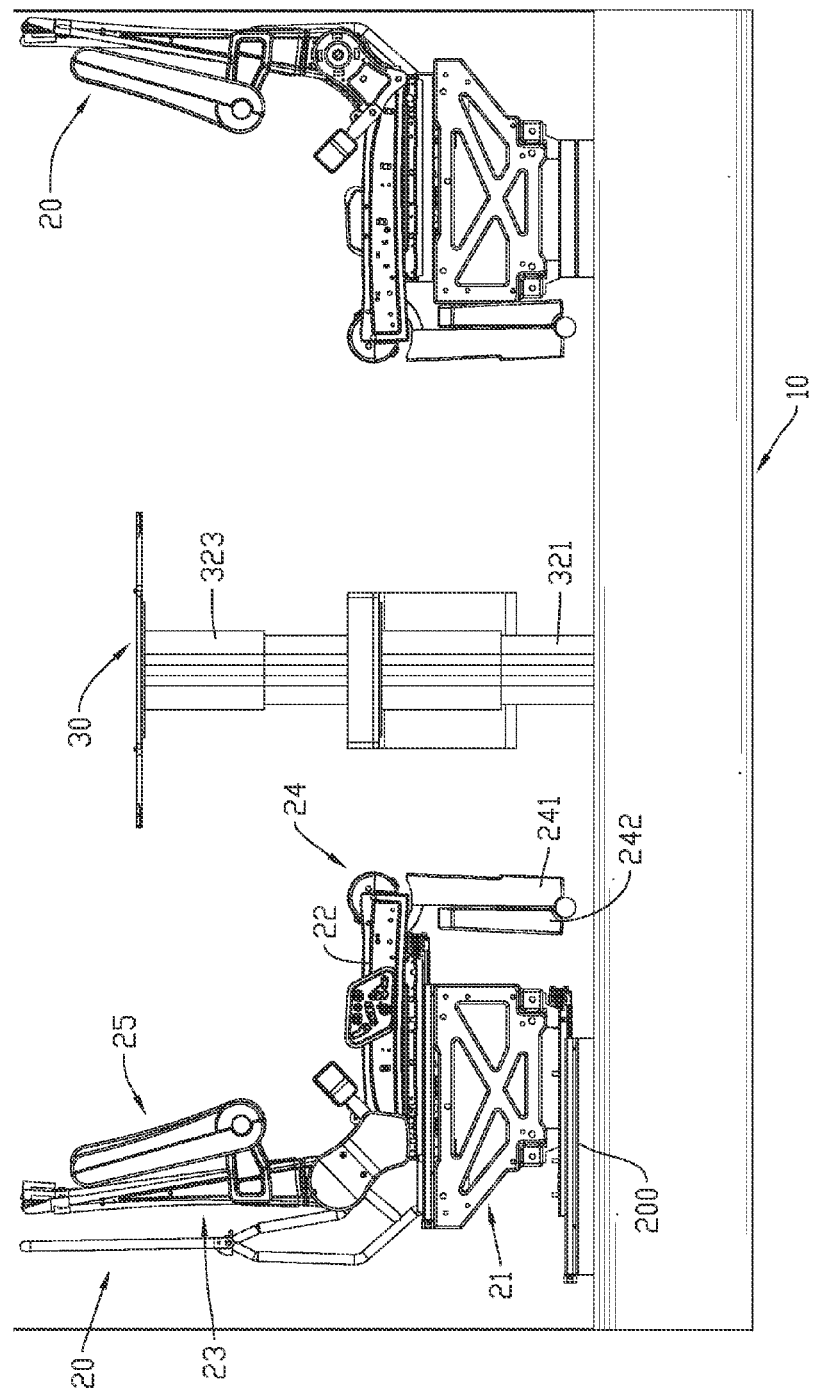
FIG. 9 is an operational side view of the multi-functional table and chair device in FIG. 7 with one of the chairs moved toward the adjustable table.
Figure 10:
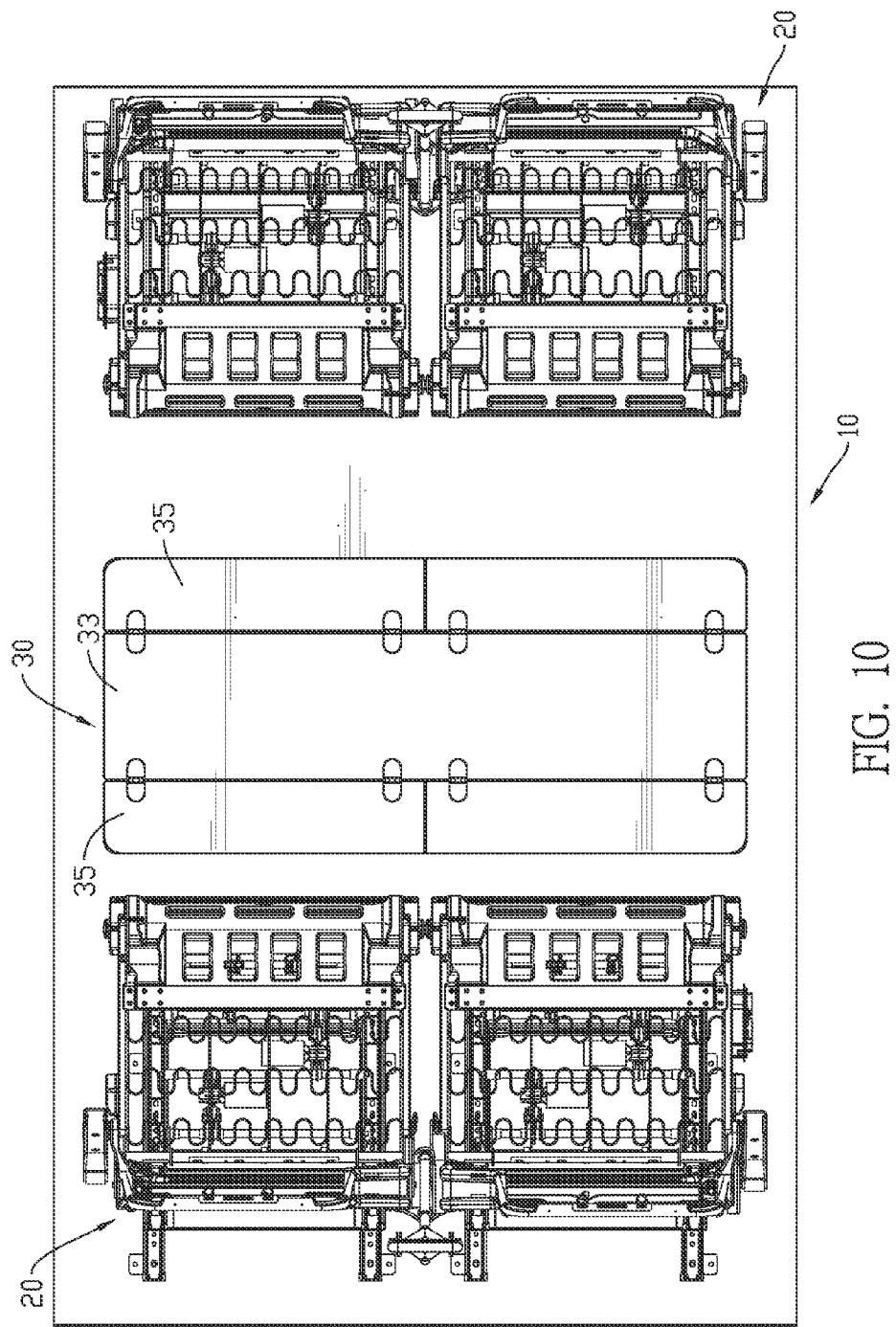
FIG. 10 is a top view of the multi-functional table and chair device in FIG. 9.
Figure 11:
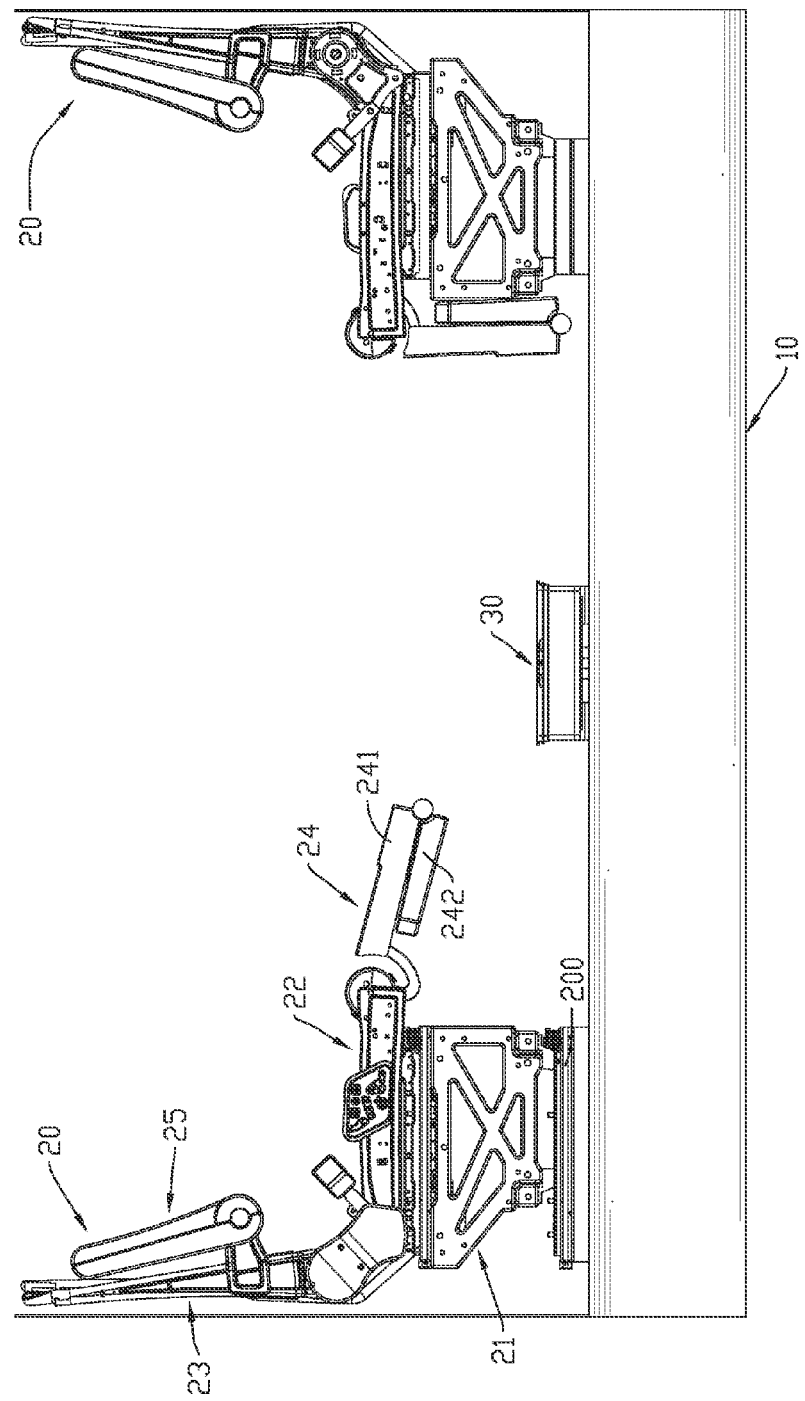
FIG. 11 is an operational side view of the multi-functional table and chair device in FIG. 7 with a seat of one chair unfolded halfway, and the adjustable table lowered down and folded completely.
Figure 12:
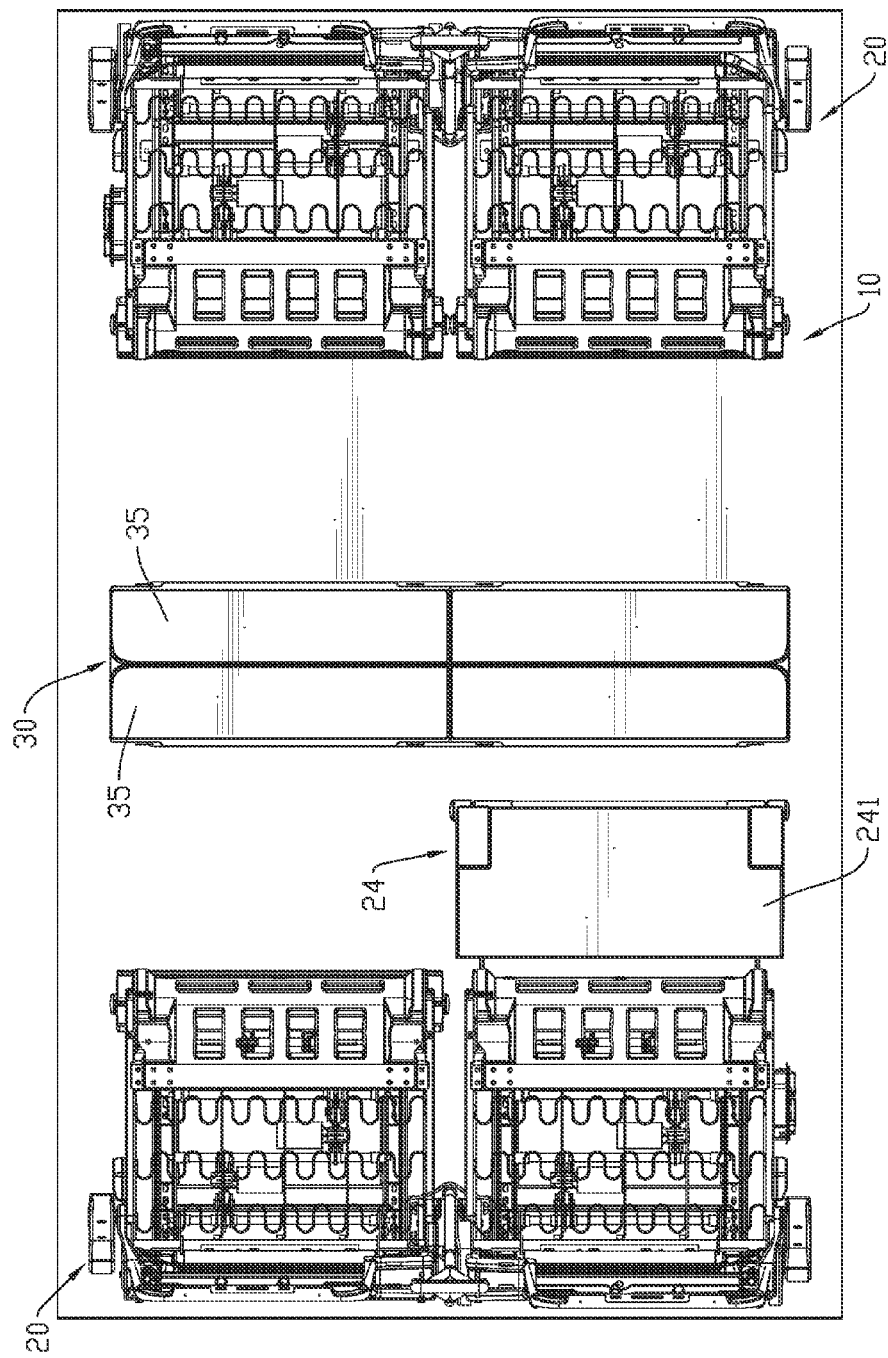
FIG. 12 is a top view of the multi-functional table and chair device in FIG. 11.
Figure 13:
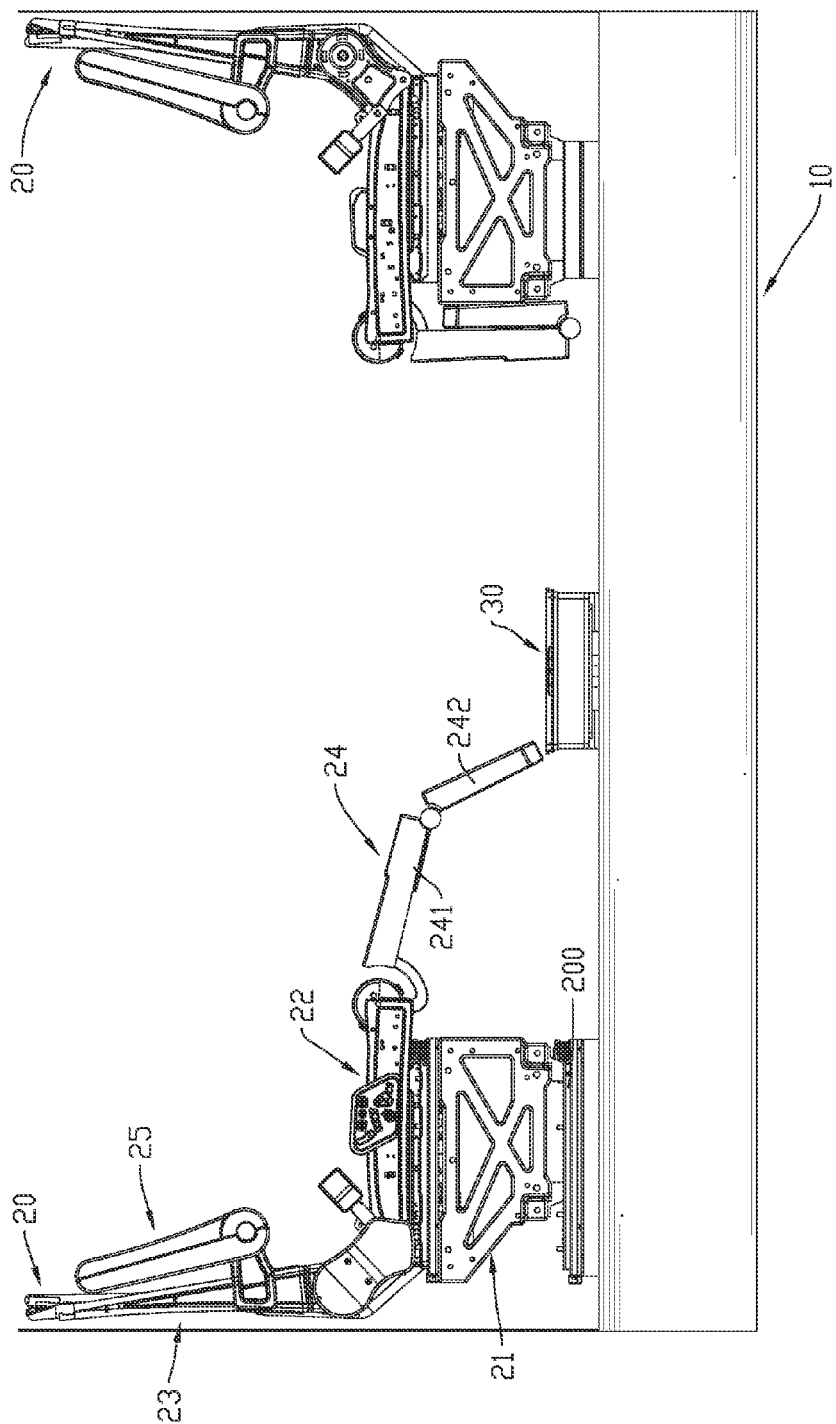
FIG. 13 is an operational side view of the multi-functional table and chair device in FIG. 11 with the footrest further unfolded.
Figure 14:
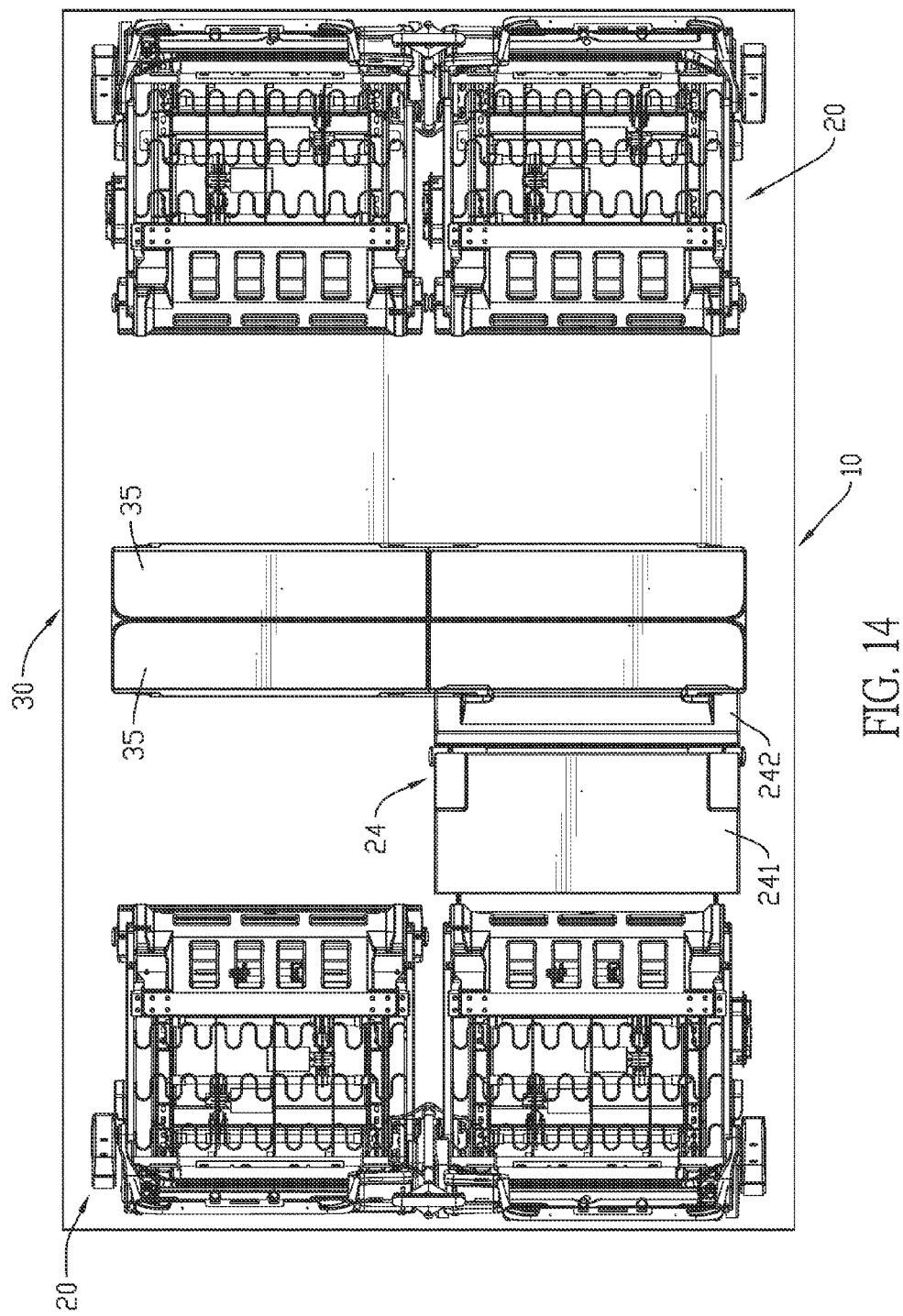
FIG. 14 is a top view of the multi-functional table and chair device in FIG. 13.

With further reference to FIGS. 9 and 10, to access the adjustable table 30, the supporting bracket 21 is moved back and forth to allow users with different figures and habits to adjust a distance between the chairs 20 and the adjustable table 30.

With further reference to FIGS. 11 to 14, when idle, the adjustable table 30 is retracted and lowered to adjacent to the base 10. The footrest 24 of one of the chairs 20 is unfolded to hold a user's feet. Furthermore, the unfolded extension plate 242 may be held by the adjustable table 30.

Figure 15:
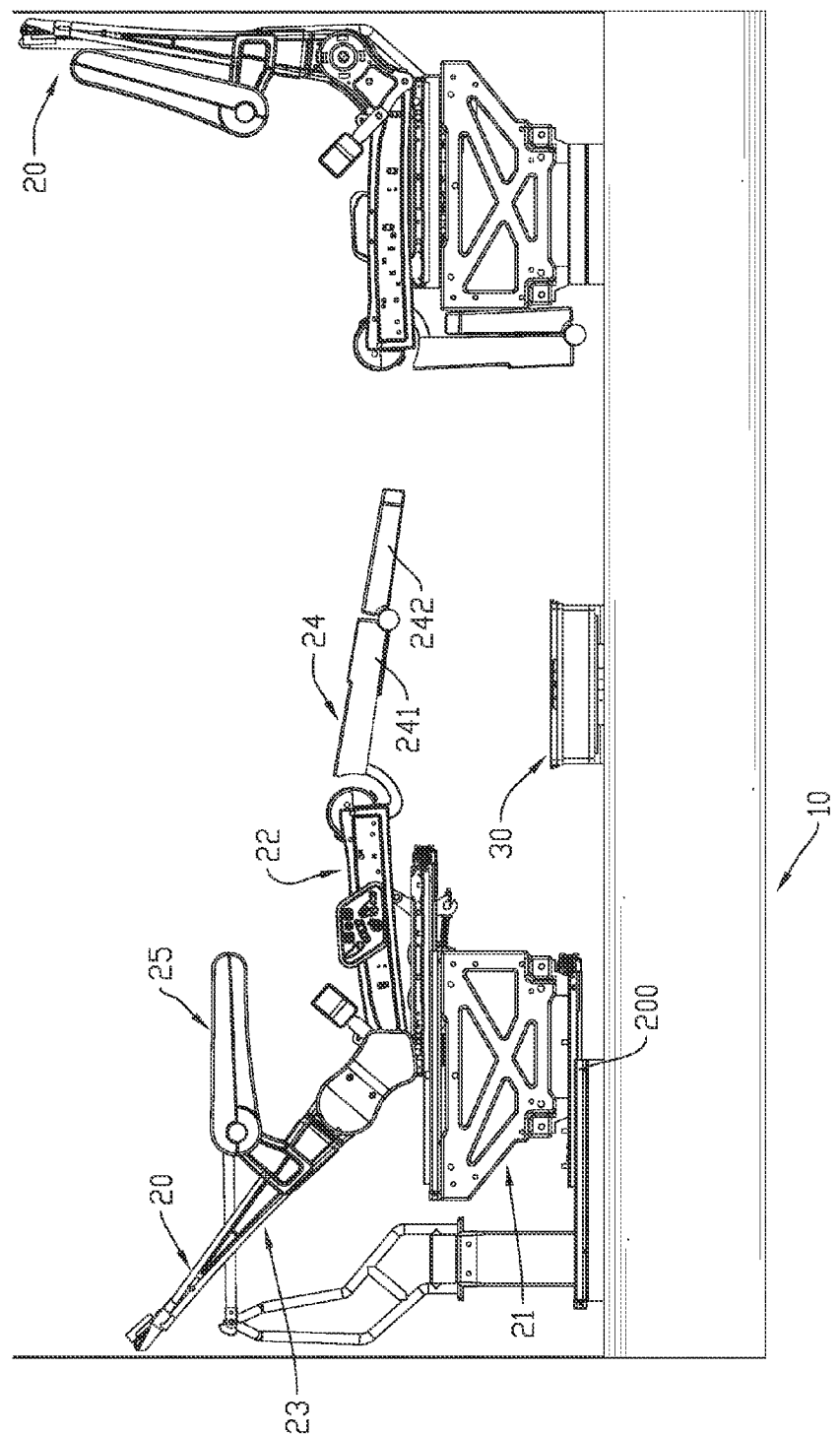
FIG. 15 is an operational side view of the multi-functional table and chair device in FIG. 1, wherein a supporting bracket of one of the chairs is moved forward relative to a rail, a seat is moved forward relative to the supporting bracket, a backrest is pivoted backward relative to the seat, and the footrest is lowered down and folded completely.
Figure 16:
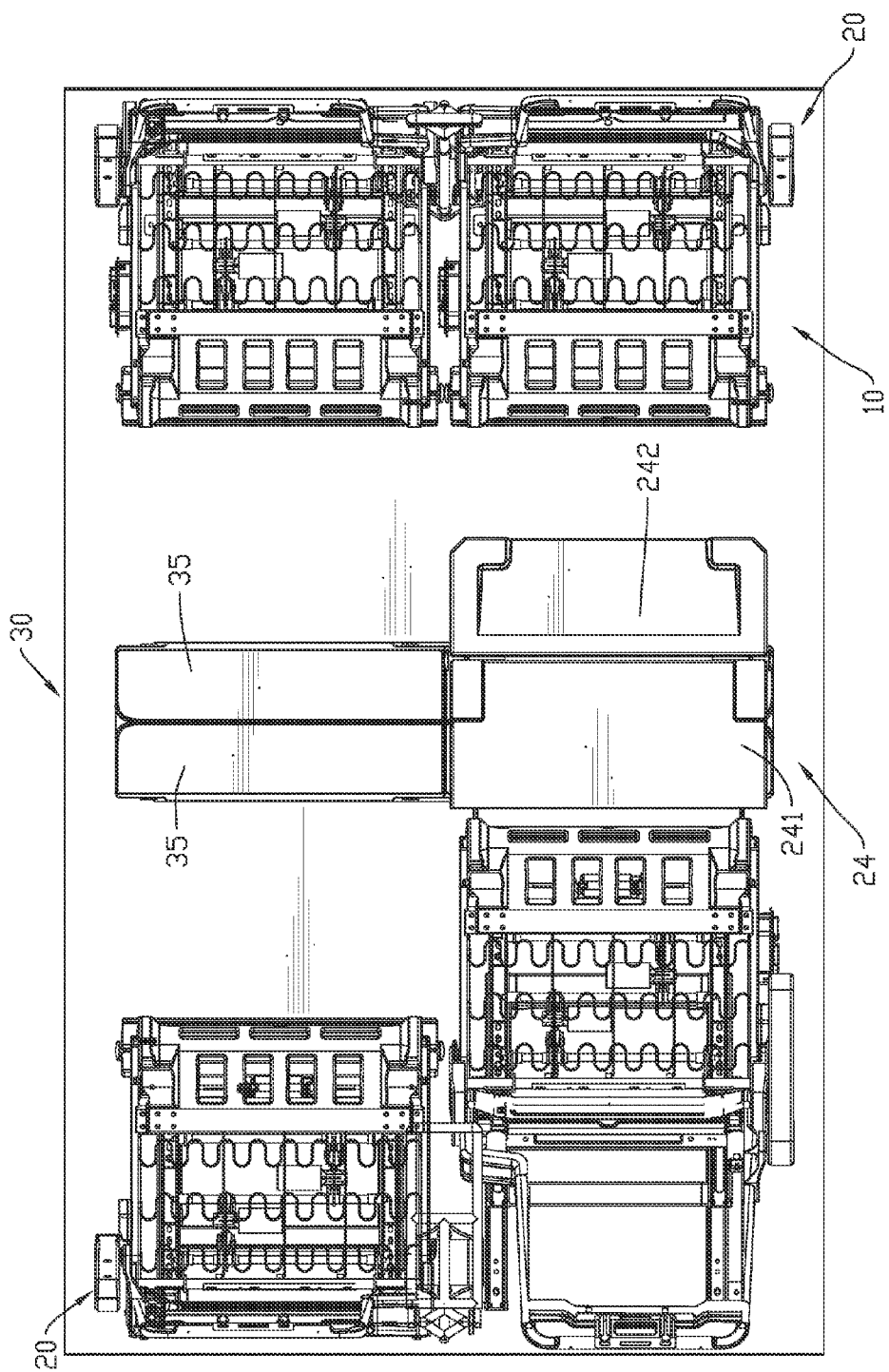
FIG. 16 is a top view of the multi-functional table and chair device in FIG. 15.

With further reference to FIGS. 15 and 16, when the adjustable table 30 is idle and lowered adjacent to the base 10, the backrest 23 of the chair 20 is pivoted backward and the footrest 24 is pivoted upward and unfolded to change the chair 20 into a deck chair to allow the user to rest for a while and even sleep.

Figure 17:
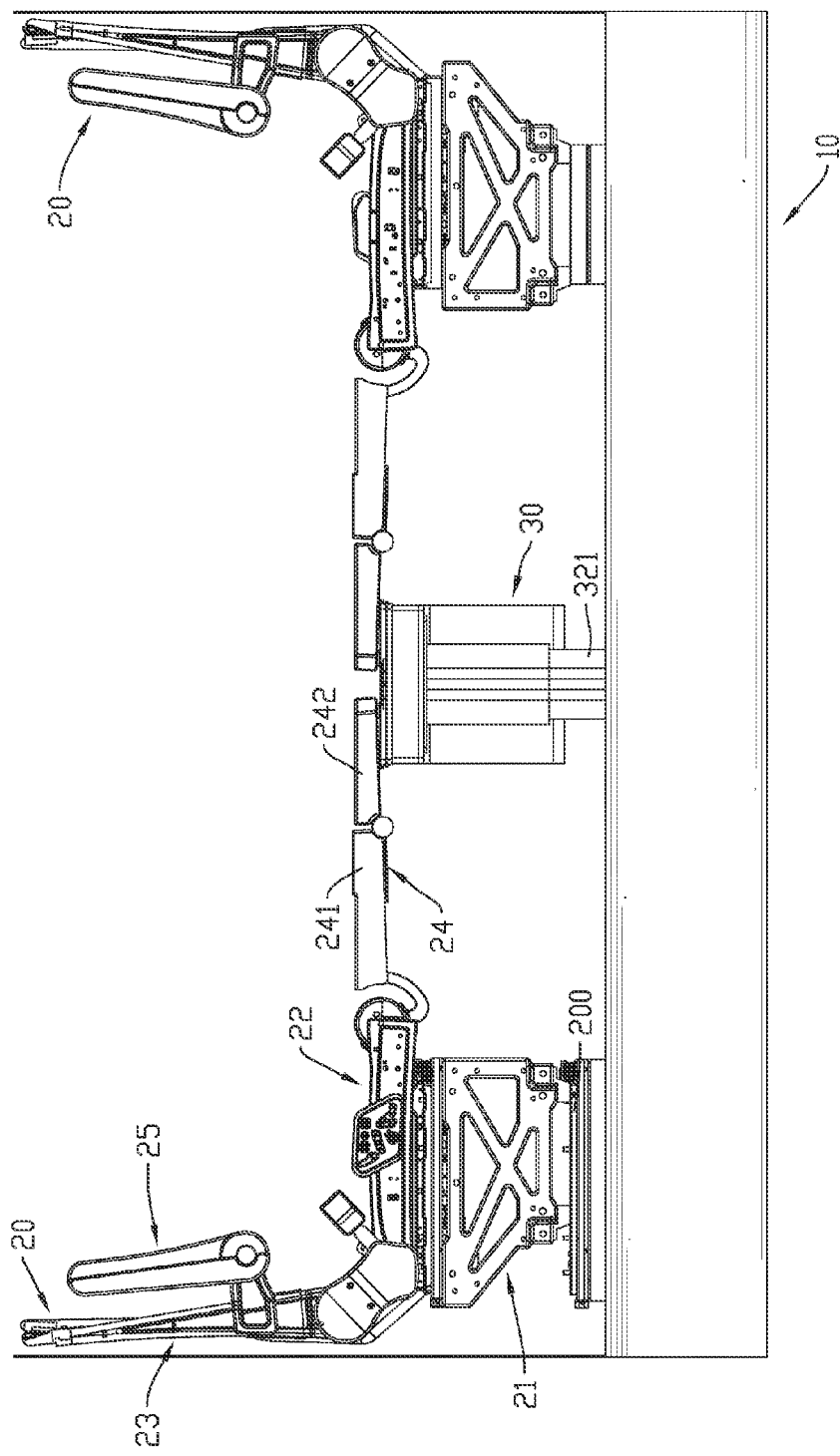
FIG. 17 is an operational side view of the multi-functional table and chair device in FIG. 1 with the footrests of two chair sets unfolded completely.

With further reference to FIGS. 17 and 18, when the footrests 24 of the opposite chairs 20 of the chair sets are pivoted upward and unfolded to be horizontal and the adjustable table 30 is raised to hold the footrests 24, the two opposite chairs 20 and the adjustable table 30 form a flat bed to allow the user to lie completely down and sleep.

The multi-functional table and chair device of the present invention has the following advantages.

1. The adjustable table 30 may be raised or lowered to different levels according to different users. Alternatively, the adjustable table 30 may be lowered and retracted adjacent to the base 10 when idle. The chair 20 allows the user to sit thereon. Alternatively, pivoting the backrest 23 backward and unfolding the footrest 24 changes the chair 20 into a deck chair. Alternatively, the footrests 24 of the two opposite chairs 20 are unfolded to be horizontal and are held by the elevated adjustable table 30 to form a flattened bed. Therefore, the multi-functional table and chair device provides users with different functions.

2. The sliding supporting bracket 21 on the base 10 and the sliding seat 22 on the supporting bracket 21 allow different distances between each chair 20 and the adjustable table 30 for different users with different figures and habits.

3. The adjustable table 30 may be raised or lowered according to different users.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multi-functional table and chair device comprising:
a base;
two opposite chair sets mounted on the base and each chair set having at least one chair, each chair having
a supporting bracket mounted on the base;
a seat mounted on a top of the supporting bracket;
a backrest mounted pivotally on a rear end of the seat; and
a footrest mounted pivotally on a front end of the seat; and
an adjustable table mounted on the base between the chair sets and having
a bottom bracket mounted on the base;
an elevation mechanism mounted on the bottom bracket and being capable of extending or retracting vertically; and
a table board mounted on a top of the elevation mechanism and selectively raised or lowered to be higher than the seat, aligned with the seat, or lower than the seat;
wherein when the backrest of the chair is pivoted backward and the footrest is pivoted upward and unfolded, the chair is changed into a deck chair;
wherein when the footrests of two opposite chairs of the chair sets are pivoted upward and unfolded to be horizontal and the adjustable table is raised to hold the footrests, the two opposite chairs and the adjustable table form a bed.

2. The multi-functional table and chair device as claimed in claim 1, wherein each footrest has
a rest plate mounted pivotally on the front end of the seat; and
an extension plate mounted pivotally on a front end of the rest plate and located above the raised adjustable table when the footrest is pivoted and unfolded to be horizontal.

3. The multi-functional table and chair device as claimed in claim 2, wherein
each chair further has a rail mounted on the base; and
the supporting bracket of each chair is mounted slidably on the rail.

4. The multi-functional table and chair device as claimed in claim 3, wherein the seat of each chair is mounted slidably on the supporting bracket.

5. The multi-functional table and chair device as claimed in claim 4, wherein each chair further has two armrests mounted respectively on opposite sides of the backrest.

6. The multi-functional table and chair device as claimed in claim 5, wherein the table board has two extension boards pivotally mounted respectively on two opposite sides of the table board and selectively folded and stacked on the table board or unfolded outward to be horizontal.

7. The multi-functional table and chair device as claimed in claim 6, wherein the elevation mechanism of the adjustable table has
- a first electronic telescopic assembly having two first electronic telescopic bars and a mounting bracket mounted between the first electronic telescopic bars; and
- a second electronic telescopic assembly having two second electronic telescopic bars mounted on the mounting bracket and mounted under the table board.

8. The multi-functional table and chair device as claimed in claim 7, wherein each chair set has two chairs arranged abreast.

* * * * *